June 23, 1959  R. W. TACCONE  2,891,789
DEVICE FOR CHECKING THE MOVEMENT OF A MACHINE PART
Filed May 27, 1957  2 Sheets-Sheet 1

*INVENTOR.*
RUSSELL W. TACCONE
BY
ATTORNEY

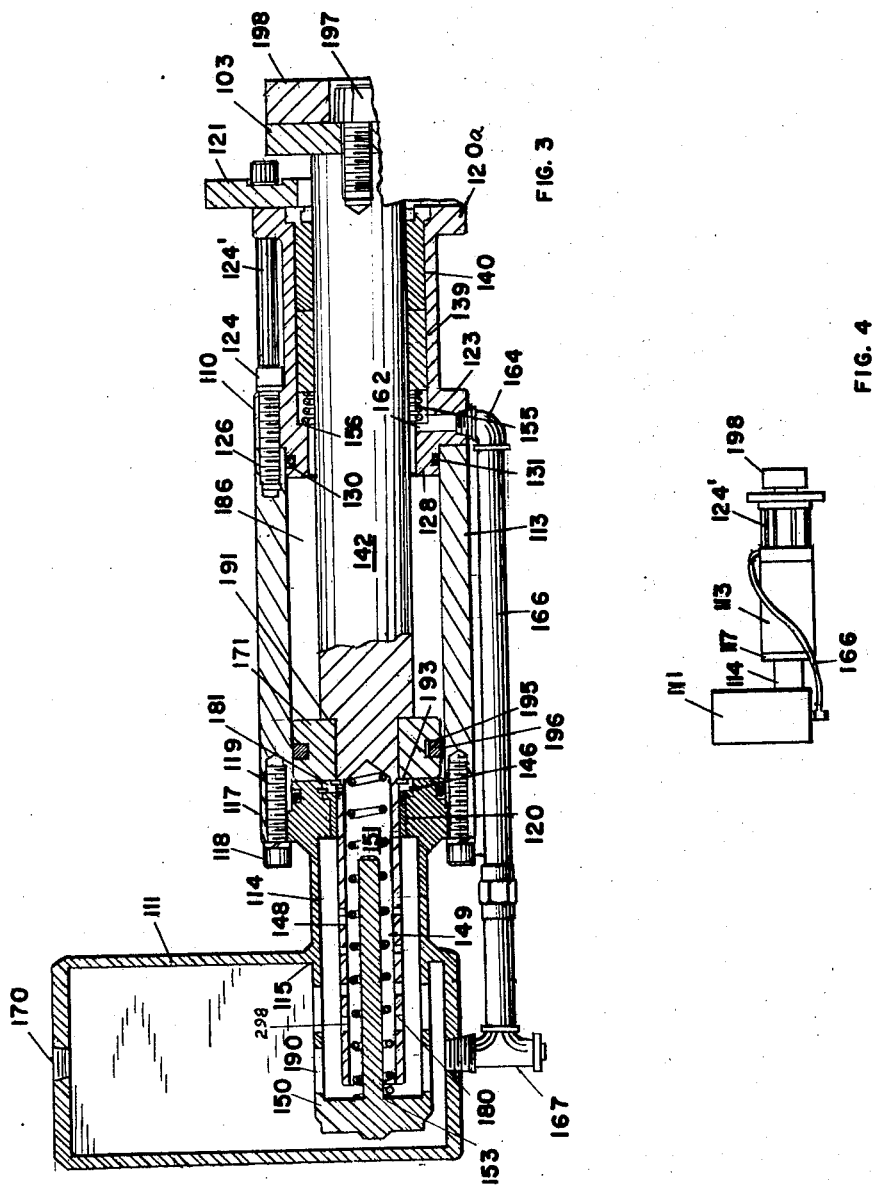

United States Patent Office 2,891,789
Patented June 23, 1959

2,891,789
DEVICE FOR CHECKING THE MOVEMENT OF A MACHINE PART

Russell W. Taccone, Erie, Pa., assignor to Taccone Pneumatic Foundry Equipment Corporation, North East Township, Erie County, Pa., a corporation of Pennsylvania Application May 27, 1957, Serial No. 661,698

6 Claims. (Cl. 267—75)

This invention relates to cushioning and checking devices and, more particularly, to shock absorbers for checking the motion of machine tool beds, press platens, foundry molding machine cars, and the like.

In machine tools and pneumatic foundry equipment where a heavy part of the machine must be moved rapidly for a given distance and brought to rest in a short time, the deceleration taking place while the part moves only a short distance, a problem has existed in bringing the part to rest without resulting in an excessive shock to the machinery itself. Various devices have been used for checking machine parts but none of them have been completely satisfactory. Hydraulic checking devices have been used which often utilized a piston in a cylinder. Then a problem existed in providing a seal between a fixed part and the movable part and in providing a seal between the piston walls and the cylinder walls so that fluid would not leak therebetween because of the high differential pressure on opposite sides of the piston.

It is, accordingly, an object of this invention to overcome the above and other disadvantages and difficulties in prior cushioning devices and, more particularly, it is an object of this invention to provide a cushioning device which is simple in construction, economical to manufacture, and simple and efficient in operation.

Another object of this invention is to provide a cushioning device made up of a hydraulic member moving inside another member wherein fluid is bled back from one side of the movable member to the other to equalize pressure on both sides thereof.

Still another object of this invention is to provide a fluid type cushioning device wherein the flow of fluid therein is free during the initial portion of the movement thereof and the flow of fluid is metered or controlled during other parts of movement thereof.

A further object of this invention is to provide a specific improved cushioning device for checking the motion of machine parts.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is a longitudinal cross sectional view of the cushioning device shown in Fig. 4 constituting another embodiment of the invention; and Fig. 4 is a side view of the device shown in Fig. 3.

Figure 1:
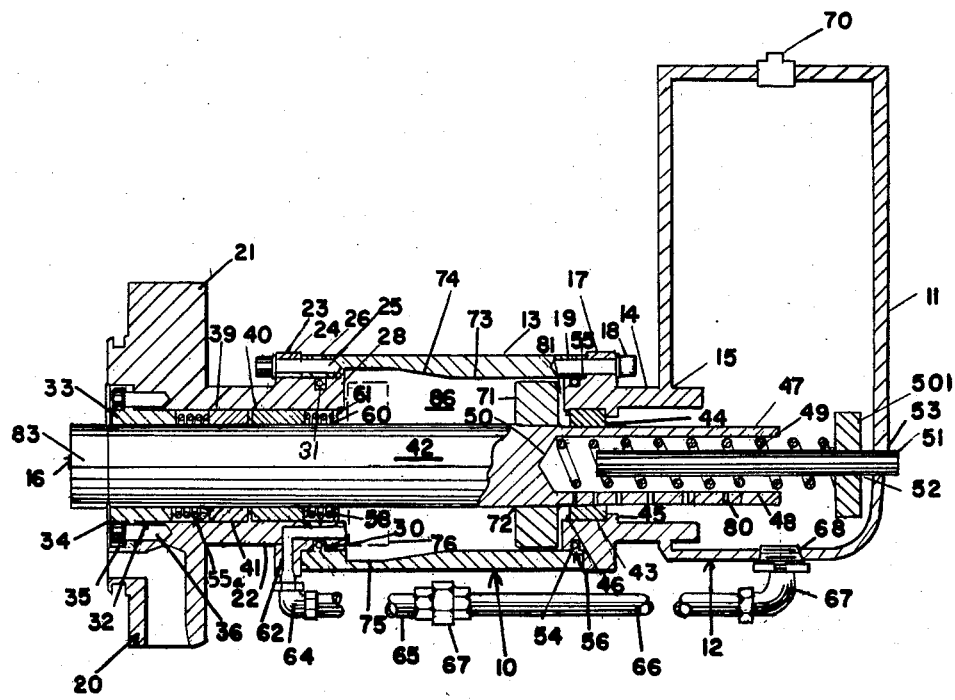
Fig. 1 is a longitudinal cross sectional view of a cushioning device according to the invention.
Figure 2:
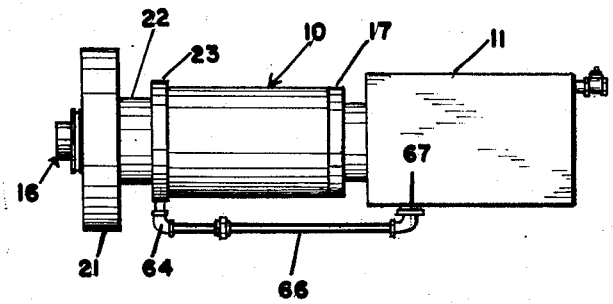
Fig. 2 is a top view of the cushioning device shown in Fig. 1.

Now with more specific reference to the drawings, in Fig. 1, a cushioning device 10 is shown having a cylinder 13 with a piston assembly 16 therein. A tank and cap assembly 12 made up of a tank 11 and a flanged member 14 integrally attached thereto at 15 has a flange 17 integrally attached to the member 14 with spaced holes therein receiving bolts 18. The bolts 18 engage threaded holes 19 in the cylinder 13 and, therefore, clamp the tank assembly 12 to the cylinder 13.

A head assembly 20 has a flange 21 and a reduced size portion 22 with a flange 23 integrally attached thereto. The flange 23 is bored at 24 to receive a bolt 25 which threadably engages a threaded hole 26 in the cylinder 13. The bolt 25 therefore holds the head 20 clamped to the cylinder 13. The head assembly 20 has a reduced size portion 28 which is received in the bore in the adjacent end of the cylinder 13. A peripheral groove 30 receives an O-shaped packing washer 31 to form a seal between the outside of the portion 28 and the inside of the cylinder 13.

A bearing 32 has a body portion 33 and a flange 34. The flange 34 is bored to receive bolts 35 which threadably engage tapped holes 36 in the head 20, thereby clamping the bearings 32 in place. Packings 39 and 40 are inserted in a bore 41 and telescopically receive a rod 42 of the piston assembly 16.

The tank assembly 12 has a bore 43 therein which receives a bearing 44 which rests against a flange 45. A spring washer 46 is received in a groove inside the bore 43 and locks the bearing 44 in place. The bearing 44 receives a tail end 47 of the piston rod 42. The tail end 47 of the piston rod 42 is bored at 48. The bore 48 is a blind hole which receives a spring 49 which engages an end 50 on one end and engages a collar 501 on the other end thereof. The collar 501 is attached to a shaft 51 at 52 and forms a stop for the spring 49. The outer end of the shaft 51 is attached to the tank 11 at 53.

A peripheral groove 54 is formed in a reduced size member 55 and an O-shaped packing washer 56 is received in the groove 54 to form a seal therein. The packings 39 and 40 are held in position by a spring 55a received between the packing 39 and the bearing 32. A compression spring 58 is received between the packing 40 and a retaining washer 60. The retaining washer 60 is held in place by a spring washer 61 held in a groove inside the bore 41.

The head 20 is bored at 62 and threaded to receive a pipe coupling 64 connected to a pipe 65 which communicates with a pipe 66 through a union 67. The pipe 66 is connected to the union 67 which is threadably received in tapped holes 68 in the tank 11. The tank 11 has a plug 70 for replenishing the fluid therein.

A piston 71 is attached to the piston rod 42 at 72 and it moves in a bore 73 in the cylinder 13. The bore 73 has a cylindrical portion of the cylinder 13. The bore 73 increases in diameter at 74 to an enlarged size portion 75 and the piston 71 moves with the piston rod 42 from the position shown in full lines to a dotted line position 76. The walls of the bore 48 have communicating holes 80 which allow fluid to flow from a space 81 between the piston 71 and the reduced size end 55 to the tank 11 and back to equalize the pressure therein.

The piston 71 is shown in the retracted position and the spring 49 urges it to the dotted line position. Therefore, when the cushioning device 10 is supported on a machine having a movable platen, table or the like, when the movable platen strikes a resilient end 83, it forces the piston 71 toward the full line position shown against the force of the spring 49. Also, it tends to force fluid through the holes 80 into the tank 11 and, at the same time, draw fluid from the tank 11 through the pipe 65 and opening 62 to a space 86 in the cylinder 13 in front of the piston 71. Some fluid leaks by the piston 71 between the piston 71 and the cylinder walls and this leakage is rapid when the piston 71 is in the enlarged portion 75. The leakage decreases as the piston 71 moves toward the full line position. The leakage and, therefore, the cushioning effect of the piston 71 is minimum when the piston 71 is in the dotted line position and increases as the piston 71 moves to the right. The cushioning effect is inversely proportional to leakage. The cushioning device 10 should be designed in sufficient size and resistance so that the device to be cushioned will be stopped when the piston 71 reaches the position corresponding to the full line position shown in Fig. 1.

In the embodiment of the invention shown in Fig. 3, a cushioning device 110 is shown having a cylinder 113 and a tank assembly 111 attached to one end and a head 120a attached to the other end. The tank 111 has a filler plug 170 threadably received at the top and at the bottom and has a pipe fitting 167 threadably received therein.

A reduced size tail portion 114 is integrally attached to the tank 111 at 115 and extends inwardly of the tank 111 and terminates in a tail portion 150 with a rod portion 151 integrally attached thereto at 153. A spring 149 is concentrically received in a reduced size bore 148 in the tail end 180 of a shaft 142. The bores 298 allow fluid to pass from a space 181 between a piston 171 and a flange 117 into the tank 111. Bores 190 are formed in the tail portion 150 to allow fluid from the tank 111 to flow into the space around the tail end of a shaft 180.

The reduced size portion 114 has the flange 117 thereon bored and threaded at 119 to receive bolts 118 in one end of the cylinder 113. A bearing 120 is received in a bore in the tail stock 114 with a flange in the counterbore at 181. The bearing 120 is held in place by a spring washer 146 received in conventional slots.

The piston 171 is supported against a shoulder 191 on the shaft 142 and is held thereagainst by means of a spring washer 193 which is received in the peripheral groove in the shaft 142. The piston 171 has a peripheral groove 195 therein which receives a packing 196 to form a seal between the outside walls of the piston 171 and the inside walls of the cylinder 113. The head 120a has a flange 123 which receives bolts 124. The bolts 124 are attached to the head 120a by threads in threaded holes 126 in the end of the cylinder 113, thereby clamping the head 120a in place thereon. The head 120a has a reduced size portion 128 received in the cylinder 113 and a peripheral groove 130 receives an O-shaped packing washer 131 to form a seal therebetween. The head 120a extends outwardly and has a packing 139 and a packing 140 received therein. The packing 139 and 140 are urged outwardly by means of a spring 155 which abuts against a shoulder 156 formed in the counterbore in the head 120a.

A plate 121 is bolted to the end of the cylinder 113 by means of bolts 124' which extend through bores in the plate 121 and engage threaded holes in the cylinder 113. A plate 103 is attached to the end of the shaft 142 by means of a bolt 197. The plate 103 has a resilient pad 198 bonded thereto.

The head 120a is bored at 162 to receive a fitting 164 which communicates through a pipe 166 to the fitting 167 which in turn communicates with the interior of the tank 111 through the fitting 167 which threadably engages the bore in the bottom of the tank 111.

When the cushioning device 110 is supported on a machine having a moving part to be stopped by a cushioning device, the piston 171 is urged toward the extreme right position by the spring 149. Then when the pad 198 is struck by the platen of the press or the moving table of the machine, the piston 171 is urged toward the left to the position shown in full lines. As the piston 171 moves toward the left, fluid will be forced through the holes 298 into the bore 148 and then to the tank fluid. The space behind the piston 171 at 186 will be supplied from the tank 111 through the pipe 166.

Therefore, the fluid inside the tank 111 and all points inside the piston 171 will remain at substantially the same pressure. Therefore, the sealing properties required of the packing 196 will not be taxed.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cushioning device comprising a hollow cylinder, a piston slidable in said hollow cylinder, said cylinder being closed at each end, said piston having a piston rod attached thereto and extending through each of said closed ends, means on one end of said piston rod for engaging a member to be checked, a container attached to the other end of said cylinder, the other end of said piston rod extending into said container, and means connecting said container with the interior of said cylinder on said first end in fluid flow relationship whereby fluid from said container can flow into said cylinder and return, the second end of said piston rod having a bore therein, and radial holes communicating from outside of said piston rod to said bore whereby fluid from between said piston and said second enclosed end can flow through said bores into said hollow in said piston rod and into said container.

2. The cushioning device recited in claim 1 wherein a spring is disposed in said hollow in said cylinder and abuts against one end thereof and the other end of said spring engages means on said container whereby said piston and said piston rod are urged to said first end.

3. A cushioning device comprising a hollow cylinder, a piston having a piston rod thereon, said piston slidable in said cylinder, said cylinder having a first and a second end, said ends being closed and the ends of said piston rod extending from said closed ends, means connecting said ends of said cylinder in fluid flow relationship whereby fluid can flow from one end to the other end of said cylinder, the inside of said cylinder hollow being larger at one end than it is at the other, said piston being of substantially the same diameter as said smaller end of said cylinder hollow, said hollow in said cylinder being of a large size adjacent said first end and tapering toward a smaller size at an intermediate part and having a smaller size at said second end, said first end having a head attached thereto and said first end of said piston rod extending therethrough, packing means disposed around said piston rod around said head, and spring means disposed on each end of said packing means urging said packing means to an intermediate position in said head on said piston rod, said second end of said piston rod being hollow and having radial holes therethrough communicating from the inside to the outside thereof, said holes allowing fluid to pass therethrough from the space between said piston and said second end of said cylinder to a container.

4. The cushioning device recited in claim 3 wherein a compression spring is disposed in said hollow second end of said cylinder and engages means on said container urging said cylinder and said piston toward said first end.

5. A cushioning device comprising a hollow cylinder, a piston slidable in said hollow cylinder, said cylinder being closed at each end, said piston having a piston rod attached thereto and extending through each of said closed ends, means on one end of said piston rod for engaging a member to be checked, a container attached to the other end of said cylinder, the other end of said piston rod extending into said container, means externally connecting said container with the interior of said cylinder on said first end in fluid flow relationship whereby fluid from said container can flow into said cylinder and return, the second end of said piston rod having a bore therein, and radial holes communicating from outside of said piston rod to said bore whereby fluid from between said piston and said second enclosed end can flow through said bores into the hollow in said piston rod and into said container.

6. The cushioning device recited in claim 5 wherein said piston rod end extending through said first end is larger than the other end, said enlarged end is integrally attached to said second end at a shoulder, and said piston is disposed on said second end and rests against said shoulder.

References Cited in the file of this patent

UNITED STATES PATENTS

| | | |
|---|---|---|
| 998,962 | Doyle | July 25, 1911 |
| 1,761,747 | Rosin et al. | June 3, 1930 |
| 2,069,056 | Barry | Jan. 26, 1937 |
| 2,695,777 | Garrison et al. | Nov. 30, 1954 |
| 2,817,284 | Long et al. | Dec. 24, 1957 |

FOREIGN PATENTS

| | | |
|---|---|---|
| 505,254 | Belgium | Aug. 31, 1951 |